United States Patent [19]

Tischer et al.

[11] 4,354,350
[45] Oct. 19, 1982

[54] HYDROSTATIC AUXILIARY POWER STEERING

[75] Inventors: Werner Tischer, Bobingen; Karl-Heinz Liebert, Schwabisch Gmund, both of Fed. Rep. of Germany

[73] Assignee: Zahnradfabrik Friedrichshafen, AG., Friedrichshafen, Fed. Rep. of Germany

[21] Appl. No.: 147,583

[22] Filed: May 7, 1980

[30] Foreign Application Priority Data

May 11, 1979 [DE] Fed. Rep. of Germany ....... 2919050

[51] Int. Cl.³ .................... B62D 5/08; F15B 13/04
[52] U.S. Cl. .................... 60/384; 137/625.69; 418/61 B
[58] Field of Search .................... 60/384; 418/61 B; 137/625.68, 625.69, 625.21, 625.24; 180/132

[56] References Cited

U.S. PATENT DOCUMENTS 3,834,278 9/1974 Goff et al. .................... 137/625.68

FOREIGN PATENT DOCUMENTS 1480720 6/1969 Fed. Rep. of Germany .
2505569 8/1975 Fed. Rep. of Germany .

*Primary Examiner*—Irwin C. Cohen
*Attorney, Agent, or Firm*—Zalkind & Shuster

[57] ABSTRACT

In a steering control valve device of the kind utilizing a metering pump and a torsional stress means for returning the flow control valve sleeve to a neutral position, there is provided a coupling sleeve between the manually operable steering spindle and the valve sleeve. Such coupling sleeve is for the purpose of providing an intermediate actuating member between the steering spindle and the valve sleeve to overcome errors in alignment and other disadvantages which can occur in conventional constructions where the steering spindle directly actuates the valve sleeve wherein rotation of the steering spindle effects axial shift of the valve sleeve for flow control purposes. The invention is particularly advantageous where the means of translating rotary motion of the steering spindle to axial movement of the valve sleeve is effected by threaded coaction.

11 Claims, 4 Drawing Figures

HYDROSTATIC AUXILIARY POWER STEERING

Cross reference is made to the following pending applications:

Werner Tischer, Ser. No. 136,740, filed Apr. 2, 1980;

Karl-Heinz Liebert and Werner Tischer, Ser. No. 136,471, filed Apr. 2, 1980;

Karl-Heinz Liebert, Werner Tischer, Christoph Deppenbrock, Ser. No. 147,601 filed May 7, 1980.

The above applications have the same assignee as the present application and show the same general constructions except for individual features claimed.

Prior art background patents:

German OS No. 1751979
German OS No. 25 05 569
German OS No. 1480 720
German OS No. 27 18 148
U.S. Pat. Re. No. 25126
U.S. Pat. Nos. 3,180,233  3,989,120  4,174,612  3,385,057

The above patents are representative of the general state of the art and show conventional construction as used in conjunction with novel features of the present invention.

In general, devices of the kind described herein have been generally known, for example, German patent OS 17 51 979 shows a combination involving a pin engaged in a cam slot or coarse thread for effecting axial shift of the valve sleeve.

The arrangement has the disadvantage that the thread is in the steering spindle while the pin is in the valve sleeve and the function causes an off center misalignment between the steering spindle and the valve sleeve due to frictional increase in operation. Such effect causes jamming of the valve sleeve which has a tight fit within the housing of the device.

Even if such misalignment could be considered negligibly small, the increased friction due to the use of a single pin at one side in addition to the tight fit of the valve sleeve in the housing there is less rotational force effective at the pin. Although the axial force effected by the thread action shifts the valve sleeve, the force component peripherally causes the slanting or cocking of the valve sleeve against the housing.

The arrangement has a further disadvantage that where the usual torsion rod is used as a valve sleeve return element for returning the valve sleeve to a neutral position, the force exerted by the torsion rod acts through the thread and leads to reduction in effectiveness of return force.

An additional disadvantage follows from the drive connection between the steering spindle and the metering pump taking place through the valve sleeve. The result leads to a deformation of the valve sleeve due to being subject to greater wear.

This application is related to an application, Ser. No. 147,601, filed May 7, 1980 for Hydrostatic Auxiliary Power Steering, of Werner Tischer et al, having a common assignee.

In order to overcome these disadvantages, it has already been proposed as shown in German patent No. 14 80 720 to provide at least two, or more advantageously three sets of coarse threads, i.e., high pitch threads, in the valve sleeve with a corresponding number of coacting threads on the steering spindle for effecting axial shifting of the valve sleeve. However, this expedient in most cases does not produce the desired result, since where off center misalignment occurs between the steering spindle and the valve sleeve by the force transmission therebetween, it occurs only via one thread. This causes jamming between the valve sleeve and the housing. A further disadvantage in the construction shown in the German patent No. 1 480 720 resides in the fact that return to neutral position is effected through a compression spring; accordingly, the expanding spring in returning the valve sleeve to neutral position is against a thread coaction effecting a slow operation and sluggish return.

Other patents in the prior art of academic interest in connection with this invention are the French patent No. 1 505 333; German patent OS No. 25 05 569; and the U.S. Pat. Nos. Re. 25126; 3,180,233; 3,989,120; 4,174,612.

The present invention overcomes the difficulties enumerated by providing a valve sleeve which has a precise sliding fit in the housing that cannot be affected by a drive connection with the steering spindle. This is by virtue of provision of a coupling sleeve being interposed between the steering spindle and the valve sleeve. The coupling sleeve has a smooth, precise fit within the valve sleeve but has a misalignment compensating intermediate connection means with the steering spindle which allows movement between the two to compensate for any off center misalignment of the steering spindle and utilizes three sets of high pitch threads between the coupling sleeve and the valve sleeve.

The invention will now be described in conjunction with the appended drawing in which.

Figure 1:
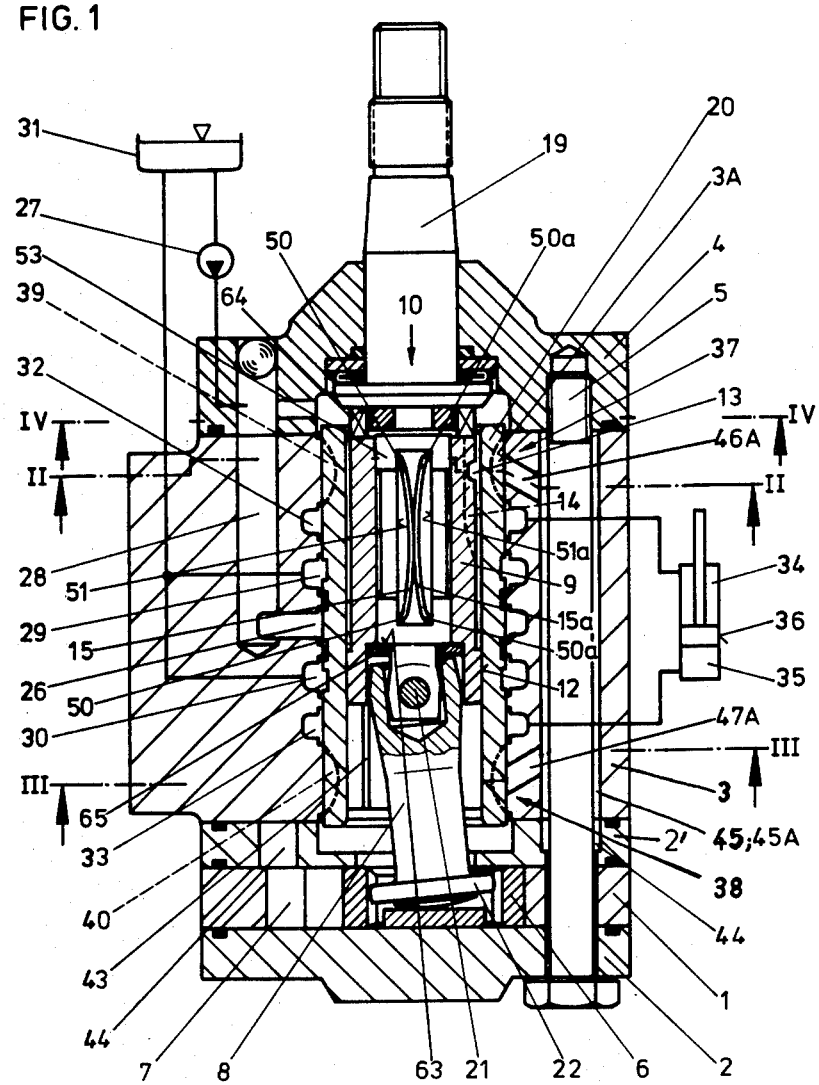
FIG. 1 is a longitudinal cross section of an auxiliary power steering device shown in neutral position.
Figure 2:
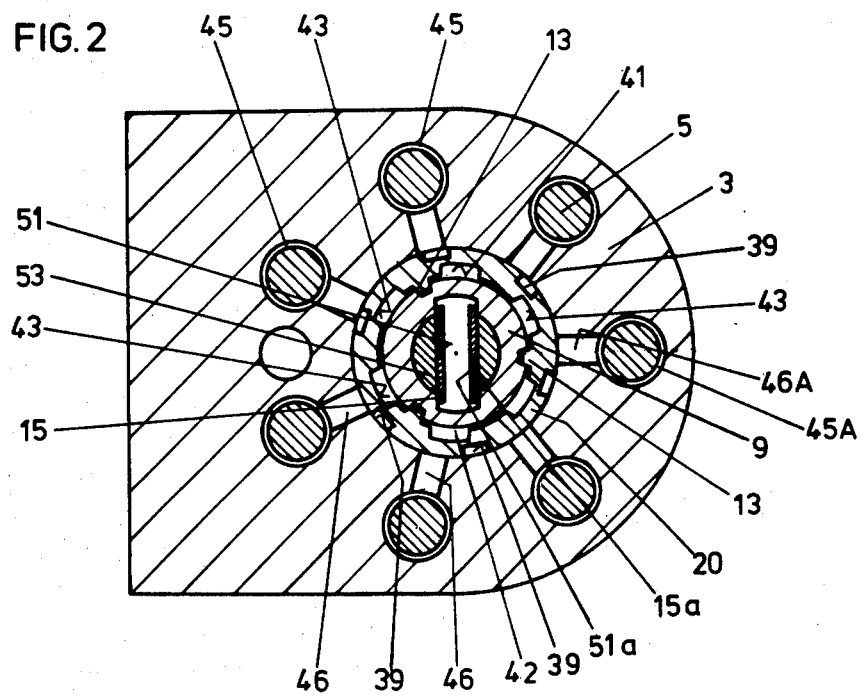
FIG. 2 is a section on the section line II—II of FIG. 1.
Figure 3:
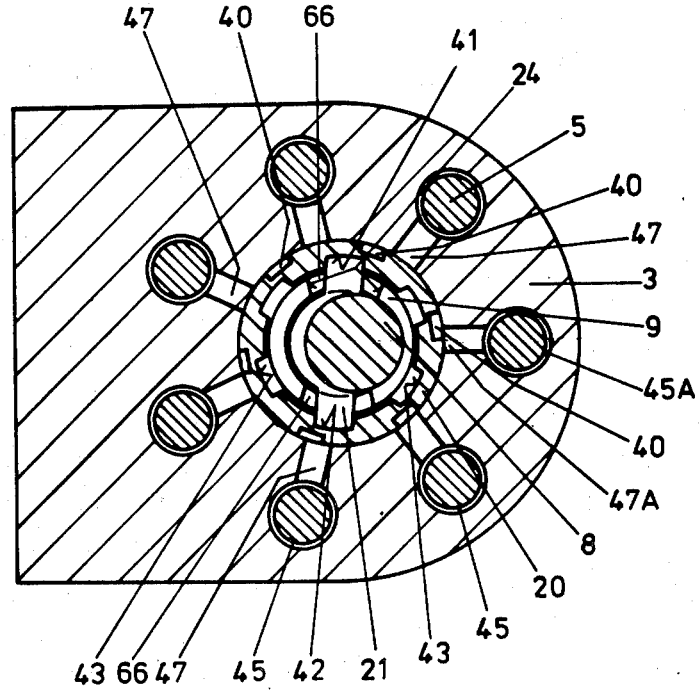
FIG. 3 is a section on the section line III—III of FIG. 1.

FIGS. 1, 2 and 3 show a metering pump having an outer gear 1 intermediate a cover 2 at an end of a housing 3, including a cheek plate 2'. The other end of the housing has a cover 4, and the entire assembly is secured together as by screws 5 passing through throughbores of the housing, as shown in FIG. 1. A rotative pump gear 6 within pump gear 1 has one less tooth than pump gear 1 and, between the two gears, pump chamber cells 7 are effected in the usual manner. Screws 5 are in enlarged bores of the housing to effect axial flow passages such as 45, FIGS. 1 and 3.

Gear 6 is articulated through a universal joint shaft 8 and keyed by means of a drive pin 21 for rotation with a coupling sleeve 9 which is in turn keyed by means of a forked joint device 10 with the steering spindle 19 which is comprised in valve sleeve actuator means. The arrow 10 indicates in FIG. 1 an intermediate connection means that compensates for steering spindle misalignment by permitting relative transverse movement.

A valve sleeve 20 is carried axially around coupling sleeve 9 within the bore 3A of housing 3. A guide collar 12 integral with the end of the coupling sleeve 9 centers the coupling sleeve with the valve sleeve. Three coarse thread coactions 13, 14 are provided in the coupling sleeve 9 and valve sleeve 20 which coact in such manner that coupling sleeve 9 is carried via the thread arrangement within the valve sleeve 20 and collar 12. A coarse thread arrangement is shown in German Pat. 14 80 720. Pin 21 (FIG. 3) extends at both ends into slidably keyed engagement with valve sleeve 20 in longitudinal slots or grooves 41, 42 which are also flow passages. To prevent initial rotation relative to the coupling sleeve 9 so that rotation of the coupling sleeve can cause axial shift of the valve sleeve via the three sets of high pitch threads the valve sleeve is held against rotation by circulation to the metering pump which cannot initially rotate due to road resistance on the vehicle wheels (not shown), a well known effect.

Valve sleeve 20, initially held against rotation can thus shift axially bidirectionally for valving purposes by action of the threading through rotation by coupling sleeve 9 which can rotate relative shaft 8 and thus the valve sleeve up to the limits provided by opposed limit stops 24 (FIG. 3) depending on direction of rotation of the coupling sleeve by the steering spindle. A pair of compressibly arched leaf springs 15 and 15a are carried in the coupling sleeve to connect the coupling sleeve 9 and the universal joint shaft 8. Drive pin 21 and drive ears 22 provide a keying action between the pump gear 6, universal joint 8 and coupling sleeve 9. Pin 21 passes through the steering spindle and extends at both ends into slot 66. The coupling sleeve rotates the sleeve valve 20 for axial shift in a manner to be described.

Relative rotation occurs between the coupling sleeve 9 and the universal joint shaft 8 (FIGS. 1 and 2) until abutment of ends of pin 21 with limits stops 24 (FIG. 3) with the sides of slots 66 which limit the torsional stress which compresses the arches of the leaf springs. As can be seen from FIGS. 1 and 3 drive pin 21 in keying action with the universal joint shaft 8 has radial guidance, with no play, within the bore of coupling sleeve 9 and extends through respective slots 66 to key to the valve sleeve 20 for holding it stationary initially while the coupling sleeve rotates to cause the valve sleeve to shift axially. However, upon abutment of pin 21 with limit stops 24, rotation is in unison with the coupling sleeve and steering spindle but no further axial shifting of the valve sleeve can occur. The general principles of such operation are well known in the prior art.

The broad concept of compressing arched leaf springs for valve return to a neutral position has heretofore been known, but the particular arrangement shown herein is believed novel, and although not claimed per se herein, is subsequently explained.

The coupling sleeve 9 is not axially shiftable, being supported at one end by abutment (FIG. 1) with the outer face 64 of a radial flange on steering spindle 19, as shown. At the other end, the coupling sleeve abuts the face 63 of an abutment disc 65 wherein such disc is in turn supported by the universal joint shaft 8. It can be seen from FIG. 1 that the drive end of the universal joint shaft in its conical motion will always have some portion of its edge in support abutment with disc 65.

For pressure regulation and control, the coaction between housing 3 and sleeve valve 20 is effected by a center pressure feed passage such as annular groove 26 in the housing connecting to pump 27 through a longitudinal passage such as bore 28. Exhaust return passages such as grooves 29 and 30 connect with respective pressure chambers 34 and 35 of a servomotor 36. Passages on the exterior surface of the valve sleeve 20 are provided in a known manner in which in neutral position permit virtually pressureless circulation of feed from pump 27 to tank 31, whereas in an axially shifted position of the valve sleeve such circulatory flow is cut off whereby a pressure chamber groove 32 or 33 is connected with the respective exhaust return groove 29 or 30 while the opposite chamber is pressurized, all as conventionally known.

At each end of the valve sleeve there is a respective group of passages, such groups being denoted as 37 for grooves 39 and 38 for grooves 40, each such group being arrayed uniformly about the periphery of the valve sleeve. Such distributor grooves 39 and 40 are extended longitudinally and of arcuate shape with longitudinal dimension limited so that their edges effect cut-off edges for valving purposes in order to coact with respective housing grooves adjacent thereto. The grooves 39 and 40 are angularly spaced from each other by one-half the angular spacing between the teeth of the rotor gear.

The usual continuous longitudinal passages such as grooves 41 and 42 are provided (FIGS. 2 and 3) internally of the valve sleeve together with continuous grooves 43 for communicating feed pressure from bore 28 to the one group 38 of grooves 40.

The longitudinal grooves 39 and 40 are in neutral position with the valve sleeve 20. In a steered position of valve sleeve 20, depending on direction of steering as controlled by steering spindle 19, the group 37, i.e., grooves 39, connect either with pressure feed bore 28 or with pressure chamber groove 32. The group 38. i.e., grooves 40, connect with pressure chamber groove 33 or with pressure feed bore 28.

The pump cells 7 communicate by way of the cheek plate 2' and the bores 44 to axial passages 45 to the plurality of grooves 39 and 40 and plurality of passages such as bores 46 and 47 (FIGS. 2 and 3). The arrangement of the bores 44 and axial passages 45 is known from German OS 27 18 148 and need not be further described. The number of such passages is equal to the number of spacings between the teeth of pump gear 1, that is, equal to the number of teeth. The bores 46 and 47 lead from passages 45 to the bore 3A of the housing 3. Two bores 46 and 47 always communicate with one axial passage 45. For example, bores 46A and 47A will be seen to connect to axial passage 45A. One bore, 46A, communicates with group 37 of longitudinal grooves 39 and the other bore, 47A, communicates with the group 38 of longitudinal grooves 40.

Upon turning of the steering spindle as by a handwheel thereon (not shown) the connection 10 is rotated to rotate coupling sleeve 9 torsionally stressing leaf springs 15 and 15a. These springs are longitudinally arched in the axial direction, supporting each other by contiguity at the arched sections. The ends 50 and 50a bent as shown are supported against corner contact surfaces 51 and 51a of the coupling sleeve 9 in a spring carrier 53 within coupling sleeve 9 (FIG. 2). Spring carrier 53 is keyed at one end by pin 21 to universal joint shaft 8, this being at one end of the springs, while the other end of the springs extend laterally in the grooves of the coupling sleeve 9 (FIG. 2) so that rotation of the coupling sleeve can effect a torsion force of the coupling sleeve effecting leaf spring compression. The springs are aligned with contact surfaces 50 and 51a, but it will be understood that the springs can be stressed compressively with relative motion between the coupling sleeve and the universal joint shaft 8 since the lower ends of the springs are held stationary by the metering pump encountering initial steering resistance.

Thus rotation of steering spindle 19 causes the leaf springs 15 and 15a to be compressively stressed yet without effecting rotation of the metering pump gear 6 i.e., initially, the spring carrier 53 being keyed to shaft 8 at that time nonrotative. Rotation of the steering spindle effects rotation of the coupling sleeve and therefore by thread action, the valve sleeve 20 is axially, but non-rotatively, shifted in a direction depending upon direction of the rotation of the steering spindle. If the manual force on the steering spindle is released and potential energy stored in the leaf springs is sufficiently great to restore valve sleeve 20 via thread action back to neutral position.

Figure 4:
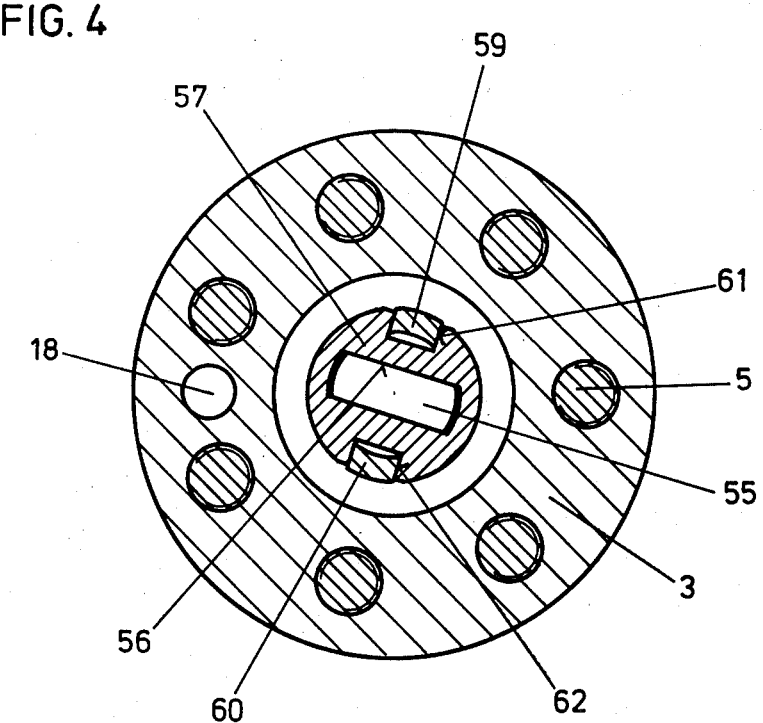
FIG. 4 is a section on the section line IV—IV of FIG. 1.

Inasmuch as coupling sleeve 9 is not integral with the steering spindle 19, it is supported in the valve sleeve only by the collar 12 and the coacting thread elements 13, 14. Radial forces which might act on the valve sleeve within bore 3A are thus eliminated. A rotational drive connection between coupling sleeve 9 and steering spindle 19 is established only through a compensating 10 connection means (FIG. 1). Thus, the steering spindle 19 has a tongue 55 as seen in FIG. 4, which fits into a slot or recess 56 of a ring 57 which is axially somewhat longer than tongue 55. Coupling sleeve 9 has lugs 59 and 60 in respective slots or recesses 61 and 62 of ring 57 wherein suitable tolerance between the lugs and recesses is provided to compensate for any misalignment between the steering spindle and the universal joint shaft 8.

Overall Operation

When the steering spindle 19 is rotated manually the misalignment compensation device 10 rotates the coupling sleeve 9 which has the coarse thread connection 13, 14, with valve sleeve 20. At this time, due to road resistance on the vehicle which, acting in a well known manner, the metering pump (gears 1 and 6) is held against rotation by vehicle wheel road resistance as is well known. Since shaft 8 is keyed to gear 6 at ears 22 (FIG.) and also to the valve sleeve 20 by pin 21 (FIG. 3), the valve sleeve cannot initially rotate but is shifted axially in either direction by the relative rotation of the coupling sleeve via the threaded connection 13, 14 to control servomotor flow. Such relative rotation in either direction takes place up to the limits opposed by limit stops, i.e., edge 24 of slots 66 (FIG. 2). Also, at this time (FIG. 2) the coupling sleeve effects torsional force to compress the arches of leaf springs 15, 15a, which at their upper ends (FIG. 1) extend into the respective diametrically opposed slots (not numbered) of the coupling sleeve (FIG. 2). The springs, due to their arched configuration, are thus compressed against each other since their lower ends in spring carrier 53 are held against rotation by the stationary condition of the valve sleeve.

After a limit of rotational motion is reached, in either direction, of the couple sleeve as determined by pin 21 engaging an edge 24 in each slot 66, the valve sleeve 20 is rotated along with the steering spindle, the coupling sleeve and the metering pump, all in unison, as long as manual steering force is applied to the steering spindle 19. At this time, springs 15, 15a are compressively stressed, i.e., in flattened condition with stored potential energy.

When the steering operation is to cease, the manual force on the steering spindle is released and the springs can then return the valve sleeve 20 to neutral position via the thread arrangement 13, 14.

Inasmuch as the particular novelty of the invention resides in the use of the coupling sleeve 9 for the prevention of any jamming action in the operation of the components, it will be appreciated that such novel feature is also useable where return movement to neutral of a valve sleeve is accomplished by a torsion rod instead of leaf springs.

What is claimed is:

1. In a servomotor system having a housing with flow passage means controlled by a valve means comprising a valve sleeve having an inner bore, and a steering spindle coaxial with the valve sleeve, including actuator means wherein said steering spindle is rotated for axially shifting said valve sleeve responsive to spindle rotation within bidirectional limits for flow control to pressurize and exhaust chambers of a servomotor, and further including a metering pump articulated to said steering spindle and said metering pump being articulated to said valve sleeve wherein said metering pump initially holds said valve sleeve stationary permitting rotation of said steering spindle relative to said valve sleeve within limits imposed by limit stop means responsive to a predetermined extent of rotation of said steering spindle to subsequently effect rotational drive of said metering pump by said steering spindle along with rotation of said valve sleeve without further axial shift; the improvement which comprises:

said actuator means comprising a separate coupling sleeve (9) within said valve sleeve (20) and engaging the bore thereof and coupling means (10) whereby said coupling sleeve is coupled to said steering spindle (19) for rotation therewith and having tolerance for transverse misalignment therewith and further comprising valve sleeve axial shifting means (13,14) between said coupling sleeve and said valve sleeve whereby rotation of said steering spindle rotates said coupling sleeve to effect axial shift of said valve sleeve for flow control.

2. In a servomotor system as set forth in claim 1, wherein said valve sleeve axial shifting means comprises coacting multiple thread means (13, 14) intermediate said coupling sleeve and said valve sleeve.

3. In a servomotor system as set forth in claim 1, wherein said valve sleeve axial shifting means comprises coacting thread means (13, 14) intermediate said coupling sleeve and said valve sleeve, including a collar (12) on said coupling sleeve slidably guided within said valve sleeve, said coupling sleeve being carried and supported within said valve sleeve by said thread means and said collar.

4. In a servomotor system as set forth in claim 1, including means for axially fixing said coupling sleeve within said steering spindle, comprising a flange (64) on said steering spindle rotative with one end of said coupling sleeve and a drive shaft (8) for said metering pump having an end rotative with the other end of said coupling sleeve.

5. In a servomotor system as set forth in claim 1, wherein said coupling sleeve is coupled to rotate with said steering spindle by an intermediate member (57) defining said coupling means coupled to said steering spindle and to said coupling sleeve, said steering spindle and said intermediate member having a keyed connection (55) with said steering spindle; said intermediate member and said coupling sleeve having a keyed connection (59–61), said keyed connections permitting relative transverse movement.

6. In a servomotor system as set forth in claim 1, including means for axially fixing said coupling sleeve comprising a flange (64) on said steering spindle in abutment with one end of said coupling sleeve and a drive shaft (8) for said metering pump having an end abuttingly supporting the other end of said coupling sleeve; said drive shaft for said metering pump being rotative with said coupling sleeve for rotation by said steering spindle and extending into said coupling sleeve;

an abutment ring (65) contiguous on respective faces with said coupling sleeve and an end of said drive shaft and therebetween.

7. In a servomotor system as set forth in claim 6, connection means articulating said drive shaft to said steering spindle comprising a swivel joint (21) at said end of said drive shaft whereby said drive shaft has conical motion of its axis in driving said metering pump with a portion of said drive shaft end always in supporting contiguity with said abutment ring.

8. In a servomotor system as set forth in claim 1, said actuator means comprising valve sleeve shift means intermediate said coupling sleeve and said valve sleeve and comprising leaf spring means (15, 15a) coupled at one end with said coupling sleeve stressed by said coupling sleeve upon rotation of said steering spindle to effect axial shift of said valve sleeve by said valve sleeve shifting means, said metering pump having a drive shaft (8) and a drive pin (21) connecting the other end of said leaf spring means with said drive shaft; including limit stop means (41) carried by said coupling sleeve; said drive pin extending to abut said limit stop means to effect drive of said drive shaft to operate said metering pump subsequent to rotation of said coupling sleeve effecting said axial shift of said valve sleeve.

9. In a servomotor system as set forth in claim 8, said drive pin extending into axially slidable keyed engagement with said valve sleeve to hold said valve sleeve stationary to permit relative rotation of said coupling sleeve until abutment of said drive pin with said limit stop means wherein said valve sleeve effects rotation with said steering spindle without further axial movement.

10. In a servomotor system as set forth in claim 1, wherein said coupling sleeve is coupled to said steering spindle by an intermediate member (57) defining said coupling means coupled to said steering spindle and to said coupling sleeve, said steering spindle and said intermediate member having a keyed connection (55) with said steering spindle; said intermediate member and said coupling sleeve having a keyed connection (59–61);

said first mentioned keyed connection comprising a tongue (55) depending from said valve spindle and a slot (56) in said intermediate member accommodating said tongue;

said second mentioned keyed connection comprising a pair of spaced slots (61, 62) in said intermediate member and said steering spindle having a pair of respective tongues (59, 60) in respective aforementioned slots, whereby said intermediate member and the keyed connections compensate for steering spindle misalignment.

11. In a servomotor system of the kind described in claim 1, said axial shifting means comprising three sets of coacting high pitch threads intermediate said coupling sleeve and said valve sleeve.

* * * * *